United States Patent [19]
Smith et al.

[11] 4,162,845

[45] Jul. 31, 1979

[54] COPIER FOR GREATER THAN STANDARD LENGTH DOCUMENTS

[75] Inventors: Wayne R. Smith, Henrietta; William G. Miller, East Rochester, both of N.Y.

[73] Assignee: Xerox Corporation, Stamford, Conn.

[21] Appl. No.: 833,424

[22] Filed: Sep. 15, 1977

[51] Int. Cl.² ........................ G03G 15/00; G03B 27/76

[52] U.S. Cl. .......................................... 355/14; 355/69

[58] Field of Search ...................... 355/3 R, 14, 67, 69, 355/71

[56] References Cited

U.S. PATENT DOCUMENTS 3,834,807 9/1974 Fuller et al. .......................... 355/3 R
3,860,338 1/1975 Reehil ...................................... 355/14

*Primary Examiner*—Fred L. Braun

[57] ABSTRACT

An electrostatic reproduction machine having an improved control circuit to control turn on of a discharge lamp positioned to discharge a moving photoconductive belt member prior to development thereof. The control circuit enables a first mode of operation for copying standard length documents of 8½ inches in length and a second mode of operation for copying documents greater in length than 8½ inches without erasing image areas by the discharge lamp. For the second mode of operation an RC adjustable circuit enables a suitable delay before lamp turn on. A machine operator can easily select the desired mode of operation.

3 Claims, 3 Drawing Figures

COPIER FOR GREATER THAN STANDARD LENGTH DOCUMENTS

This invention relates to an electrostatic reproduction machine having lamp discharge of image areas and particularly to a dual mode of operation enabling different image discharge periods for copying standard length document information and lengths greater than the standard length.

BACKGROUND OF THE INVENTION

It is common to use an image discharge or fadeout lamp to control development of a xerographic photoconductor member with a minimum use of developer material by energizing the lamp at preset periods. The lamp which is energized at preset periods during the copying cycle serves to dissipate the charge in selected areas of the photoconductor member normally between images to prevent development thereof. This in turn reduces the use or consumption of developer material as well as the load on the photoconductor member cleaning apparatus to effect increased efficiency of high speed machines which use a great deal of developer material.

It is further known that the timing of the lamp on and off cycles may be varied for different operating modes in the case of image reductions to effect a greater on period of the lamp for a predetermined image reduction as described in U.S. Pat. No. 3,860,338 which is commonly assigned with the instant application. The instant application is for an improvement to the control of the lamp which enables copying document material greater in length than an 8½ inch document which is the reference used to control the turn on of the lamp in the pitch direction. Thus, by the instant invention the turn-on period of the lamp is delayed by a preset period during the pitch distance between image frames on the photoconductive member to enable the copying of standard length 8½ inch documents during a normal mode of operation and lengths greater than standard length during a special mode of operation. Thus, in a special mode documents having tabs or 9 inch documents could be copied.

OBJECTS OF THE INVENTION

It is therefore the principal object of the invention to improve the electrostatic reproduction machines to enable copying of documents which are greater than standard length documents of 8½ inch length.

It is another object of this invention to utilize a fadeout lamp and lamp control circuit for controlling the presence of an electrostatic charged areas on a photoconductive member for different modes of operation prior to entry of the member in the development zone thereby controlling those areas to be developed for each mode of operation.

It is another object of the invention to provide improved control for the fadeout lamp of an electrostatic reproduction to enable greater use of the machine for different copy needs.

The instant invention is accomplished generally speaking by providing alternate control circuits which control the turn-on of the discharge lamp at different preset intervals corresponding to the fixed document length and a length greater than the fixed document length respectively. A switching circuit selects the particular circuit desired at the option of machine operator.

For a better understanding of the invention as well as other objects and further features thereof reference is had to the following detailed description of the invention to be read in conjunction with the accompanying drawings wherein:

DETAILED DESCRIPTION OF THE INVENTION

Figure 1:
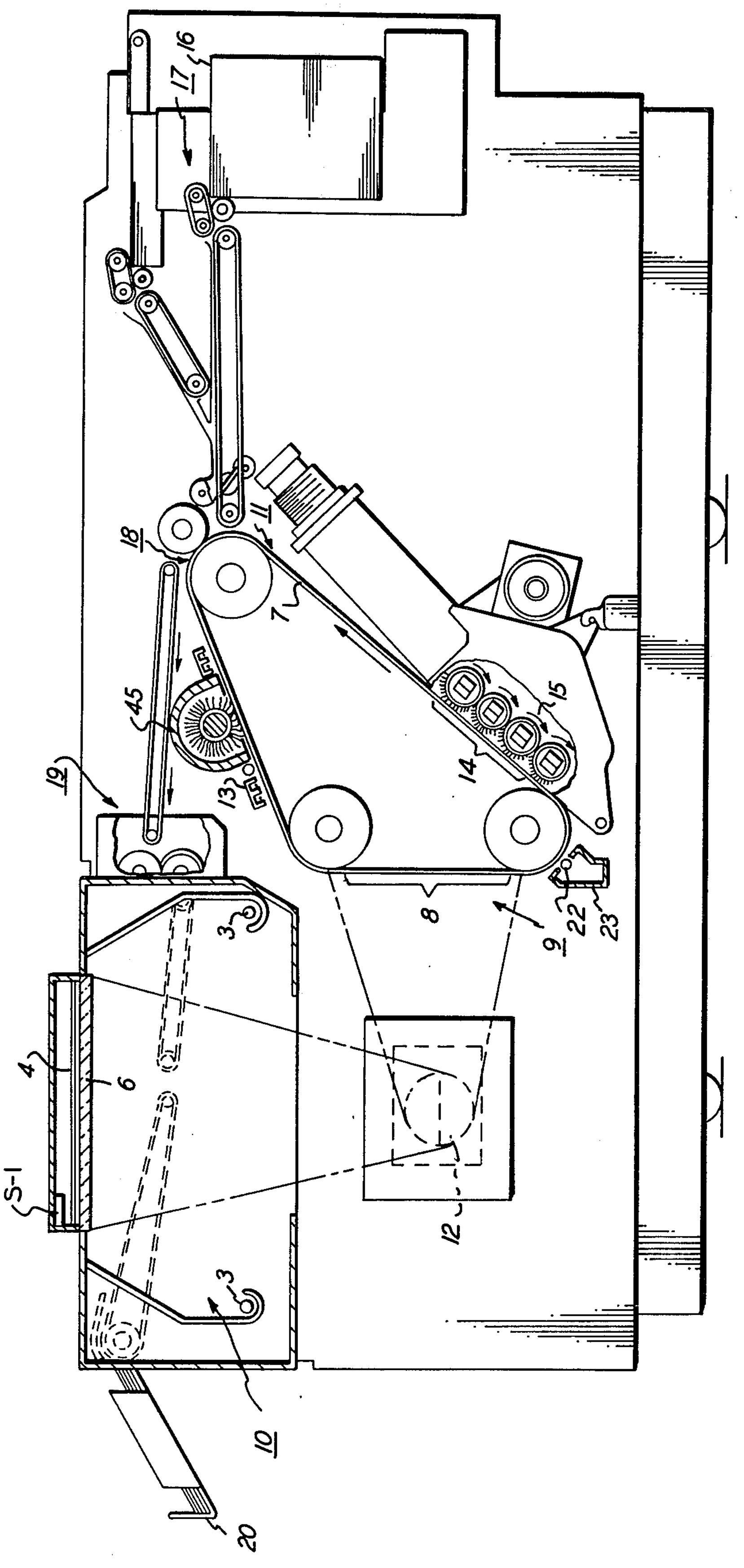
FIG. 1 is a side view of an exemplary reproduction machine incorporating the improved fadeout lamp control circuit of the present invention.

For a general understanding of the illustrated copier reproduction machine 5 in which the invention may be incorporated reference is had to FIG. 1 in which the various system components for an exemplary reproduction machine are schematically illustrated. As in all electrostatic systems such as a xerographic machine of the type illustrated, a light image of a document to be reproduced is projected onto the sensitive surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In the illustrative machine an original 4 to be copied is placed on a transparent support platen 6 fixedly arranged in illumination assembly generally indicated by the reference numeral 10 to the left of the machine as seen in FIG. 1. Illumination assembly 10 includes suitable flash lamps 3. While upon the platen light generated by lamps 3 produces image rays corresponding to the informational areas on the original 4. The image rays are projected by means of an optical system 12 to expose the photosensitive surface of a xerographic plate. The xerographic plate is in the form of a flexible photoconductive belt 7 arranged on a belt assembly generally indicated by the reference numeral 11. The surface of the belt 7 comprises a layer of photoconductive material such as selenium on a conductive backing that is sensitized prior to exposure by means of a charging corona generator device indicated at 13.

The photoconductive belt assembly 11 is mounted upon a support bracket secured to the frame of a machine, belt 7 being driven in a direction of the arrow as shown in FIG. 1 at a constant rate. During movement of the belt 7, the reflected light image 8 of the original 4 being copied on the platen 6 is flashed upon the xerographic surface of belt 7.

The exposure of the surface of belt 7 to the light image discharges the photoconductive layer in the areas struck by light, whereby there remains on belt 7 an electrostatic image 8 having an image configuration corresponding to the light image projected from the original 4 on platen 6. As the belt surface moves the electrostatic image 8 passes through a developing station 14 in which there is positioned a developer assembly 15 in the form of series of magnetic brushes. Brushes 15 bring developing material in the form of toner to development relationship with the electrostatic latent image 8 on the belt 7.

The developed electrostatic image on belt 7 is transferred, at transfer station 18, to a sheet 16 of copy paper moving in synchronism with the moving belt 7. Copy sheets 16 are supplied by suitable sheet transport mechanism generally indicated at 17, from a suitable paper supply generally indicated by reference numeral 2.

Following transfer, the copy sheet 16 is separated from belt 7 and conveyed to a fuser assembly generally indicated by reference numeral 19 wherein the developed and transferred xerographic powder image on the sheet 16 is permanently affixed thereto. After fusing, the finished copy is discharged from the machine at a suitable point as for example tray 20.

It will be noted that a discharge fluoroescent lamp 22 which is mounted in a suitable housing 23 secured to the base of the machine and arranged such that lamp 22 extends transversely across the path of movement of the belt 7 downstream of the exposure station 9 is used to dissipate the charge in those areas of the moving belt 7 where exposure has not been provided in order to prevent development of these areas and consequently minimize the loss of toner particles occassioned by developing a solidly charged area of the belt and a resulting load placed on the belt cleaning system shown in exemplary fashion as rotary brush 45.

As already mentioned it is known to control the on-time or exposure of the lamp 22 in a situation where there is image reduction as described in U.S. Pat. No. 3,860,338. However, in the case of the instant invention the turn-on of the lamp is delayed from a reference preset interval for normal routine operation of the machine to enable copying document lengths having, for example, a tab portion which is normally 9 inches in length as opposed to an 8½ inch length or a standard document sheet to provide wider flexibility in the use of the electrostatic reproduction machine.

Figure 2:
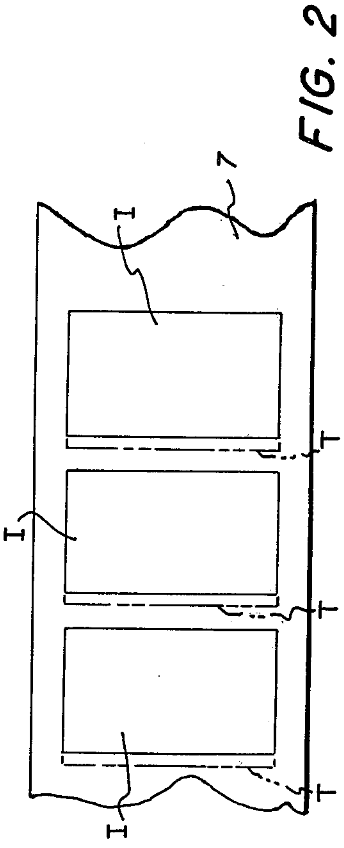
FIG. 2 is a plan view of the photoconductive belt member illustrating the relationship between images from standard length documents and images from greater than standard length documents.

In accordance with the invention the machine operator can selectively alter the normal mode of operation to a different mode of operation enabling copying of 9 inch document sheets. Referring now to FIG. 2 there is shown multiple image areas I as they appear on the xerographic photoconductive belt member during imaging thereof. It will be noted that fluorescent lamp 22 is turned on during the pitch interval between images I which extends for approximately 1½ inches where the length of the image is about 8½ inches. In order to select the longer than standard document copying mode of the instant invention as for example, a 9 inch document the turn-on period of the lamp 22 must be delayed by ½ inch as shown by the dashed line T. Thus, the turn-on of lamp 22 is delayed by approximately 25 milliseconds for a 9 inch length document in high speed duplicators where the belt speed is about 20 inches per second.

Figure 3:
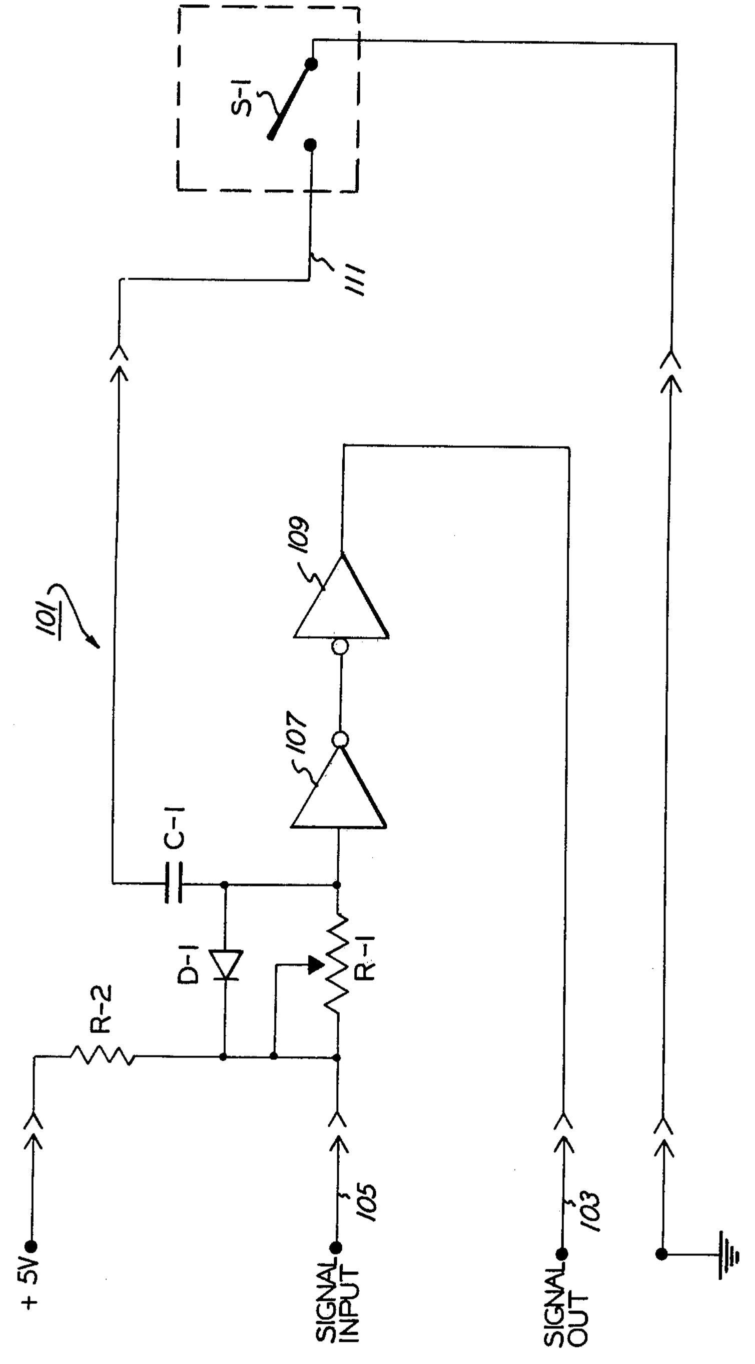
FIG. 3 is a schematic electrical diagram of the improved lamp contol circuit of the present invention.

Referring now to FIG. 3 there is shown a circuit 101 for controlling the turn-on point for the lamp 22 at the critical preset interval. The function of the circuit 101 is to delay the turn on of the lamp to enable copying document lengths greater than 8½ inches while at the same time it does not delay the turn off of the lamp from its normal turn off pulse. A signal out 103 drives a solid state switch device (not shown) which turns the lamp on and off. The interdocument lamp is off when the signal out is low and on when it is high. Normally when the lamp is off a signal input 105 is low or at ground.

When this signal input 105 goes high or to +5 volts, voltage is applied to an inverter 107 thru adjustable resistor R-1. This provides a low output from inverter 107 which then emerges as a high output from an inverter 109. This high output from inverter 109 permits an on condition for the lamp. During this switching no delay is incurred.

For a mode of operation for copying greater than standard length documents a switch S-1 is closed which grounds a capacitor C-1. Thus, when signal input 105 goes high inverter 107 will not switch until capacitor C-1 becomes charged. The time required to charge capacitor C-1 is a functon of the adjustable resistance set in adjustable resistor R-1. Inverter 107 will not switch until capacitor C-1 becomes sufficiently charged to see a high at its input. It is C-1's charging time that delays the signal input from switching inverter 107 which in turn switches inverter 109 providing the high or +5 volts at signal out 103 which permits turn on of the lamp.

To prevent delay of the turnoff of the lamp, a diode D-1 is placed across adjustable resistor R-1. When the signal input 105 goes low or to ground and the switch S-1 is closed grounding capacitor C-1, C-1 discharges thru diode D-1 to ground. Since effective time is lost in this process, this provides an immediate low to inverter 107 switching the output of inverter 109 to low and making the signal out 103 low or ground thereby turning off the lamp with no effective delay. It is apparent that if an error or a discontinuity occurs in wiring harness 111 coupled to the switch S-1, capacitor C-1 cannot be grounded and therefore will not charge. This feature enables the machine to revert to normal machine operation for copying standard or 8½ inch documents.

It will now be appreciated that the above described circuit provides a suitable time delay for turn on of the discharge lamp to permit additional imaging area on the photoreceptor member.

While the invention has been described with reference to the structure disclosed it is not confined to the details set forth but intended to cover such modification or changes as may come within the scope of the following claims.

What is claimed is:

1. In an electrostatic reproduction machine including a photoconductive member moveable past processing stations including means for charging said member, means for exposing said member to document information to produce latent electrostatic images thereof on said member, means for developing the electrostatic images on said member and a discharge lamp positioned upstream from said developing means at a predetermined position operative to discharge said photoconductive member for a predetermined period prior to its advancing to the development station, and the improvement wherein circuit means for providing control signals in a first mode of operation to activate said discharge lamp at a preset interval corresponding to a standard document dimension, said circuit means includes means for providing control signals in a second mode of operation to activate said discharge lamp at preset intervals which are delayed from a reference associated with the intervals of said standard document dimension to enable imaging from document information having a dimension greater than said standard document dimension, and switching means for selecting either said first or second mode of operation at the option of a machine operator.

2. A machine according to claim 1 wherein said circuit means includes an adjustable RC circuit means to control selectively turn on of said discharge lamp.

3. A machine according to claim 2 wherein said RC circuit means includes capacitance means coupled to ground whereby if a discontinuity occurs in wiring coupled to said switching means, the machine reverts automatically to said first mode of operation.

* * * * *